July 27, 1954 E. H. DALE 2,685,078

SELECTIVE RINGING CONNECTION FOR PARTY LINE TELEPHONES

Filed Aug. 25, 1952

Eugene H. Dale
INVENTOR.

BY
Attorneys

Patented July 27, 1954 2,685,078

UNITED STATES PATENT OFFICE 2,685,078

SELECTIVE RINGING CONNECTION FOR PARTY LINE TELEPHONES

Eugene H. Dale, Staunton, Va.

Application August 25, 1952, Serial No. 306,262

2 Claims. (Cl. 340—159)

This invention relates to a selector switch for a party line telephone and particularly to a switch for ringing a single phone of a party line system in response to a predetermined ringing arrangement.

In the operation of party line telephones it has been customary to have a plurality of parties on a line and to designate which party is to answer the ring by the use of a combination ring. For example, a predetermined number of shorts and longs arranged in different sequences for each of the customers. Considerable difficulty is encountered because parties to the customer system frequently do not hear all of the rings and must listen for a repeat ring and count the rings to find out who is being called. Also difficulty is encountered because while one party is being called to the line another party will raise the receiver of their telephone and consequently disconnect the ringing equipment so that the party being called does not completely hear all of the call. Further, it frequently happens that a sequence of noise on the customer's premises will so confuse the ringing sounds that the customer was unable to tell who was called.

It is extremely desirable that when the subscriber hears the phone ring he should know that he is being called and consequently answer without the necessity of counting the rings or otherwise identifying who is being called. Likewise, if the subscriber knows that when the bell rings he must answer, it will greatly facilitate answering the telephone in the night time when the phone is frequently so far away from the sleeper that he is unable to determine the exact sequence of the calls.

According to the present invention this is accomplished by means of a selector switch having a slide member carrying one contact of the bell ringing system and an arm containing the other contact of the bell ringing system and a system for moving the slide member so that the two contacts will be in position so that a long ring will cause the contacts to close and ring the telephone. Obviously, each set of the party line telephones will have a different number of selector impulses to place the switch in closing position so that only one of the telephones of the party line system will be operated in response to a predetermined signal.

It is accordingly an object of the invention to provide a selector switch for a party line telephone.

It is a further object of the invention to provide a switching device which is operative to select any one of the party line telephones for ringing operation.

It is a further object of the invention to provide a selector switch which will automatically reset after each ringing operation.

Other objects and many of the attendant advantages of the present invention will be apparent from the following detailed description taken in conjunction with the accompanying drawing in which.

Figure 1:
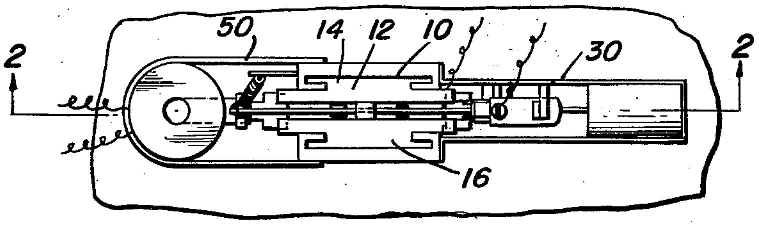
Figure 1 is a top plan view of a selector switch according to the invention.
Figure 2:
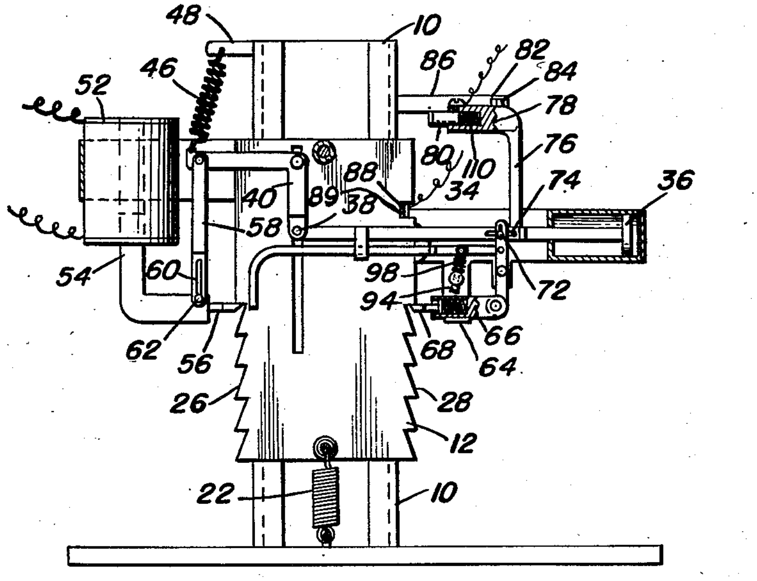
Figure 2 is a vertical elevation through the switch taken substantially on the plane indicated by the line 2—2 of Figure 3 and showing the switch in deenergized or deactivated condition.
Figure 3:
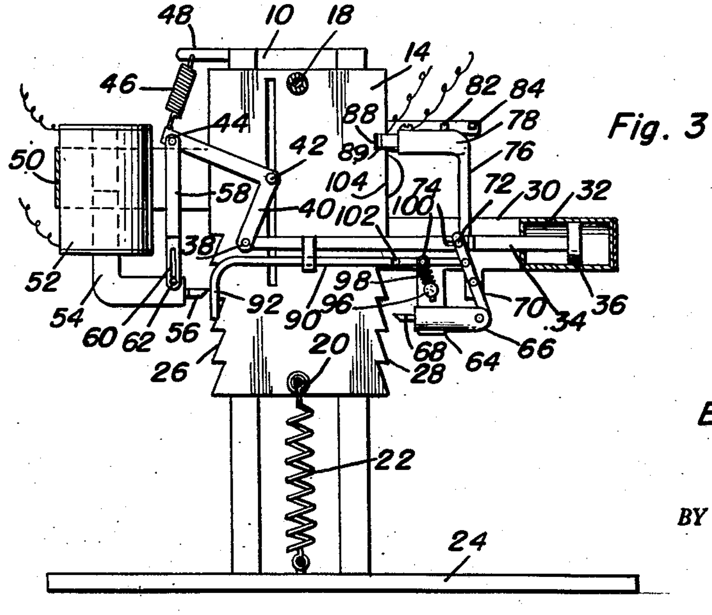
Figure 3 is a view similar to Figure 2 and showing the switch in actuated condition with the phone being operated.

In the exemplary embodiment of the invention, a track 10 is provided with a slide block 12 herein shown as two portions 14 and 16 connected together by spacer members 18 and 20. The slide block 12 is resiliently urged to a predetermined inoperative position by means of a spring 22 connected between the spacer 20 and a base 24 for the selector switch. The slide block 12 is provided with two series of rack teeth 26 and 28 for a purpose presently to be described.

The base member containing the track 10 is provided with a laterally extending arm 30 in which is mounted a suitable time delay device such as a dash pot 32. A link 34 is connected to the plunger 36 in the dash pot 32 and the other end of the link 34 is connected to one end 38 of a bell crank 40 which is pivotally connected to the track 10 by means of a pivot pin 42. The other end 44 of the bell crank 40 is urged in an upwardly direction by means of a resilient element such as a spring 46 which is connected to an arm 48 likewise mounted on the track member 10. The arrangement being such that the piston 36 in the dash pot 32 retards the movement of the link 34 under the urging of the spring 46. A bracket 50 is likewise mounted on the track 10 and supports a solenoid 52 in which is slidably mounted a plunger 54 carrying a pawl 56 which is spring pressed for cooperation with the rack teeth 26. A control link 58 is connected to the end 44 of the bell crank 40 and is provided with a lost motion connection such as a slot 60 engaging a pin 62 on the plunger 54. The lost motion connection including the slot 60 operating with the pin 62 permits limited differential motion between the plunger 54 and the control link 58.

A slide bearing 64 is mounted on the arm 30 and a pawl carrier 66 is slidably mounted therein having a spring pressed pawl 68 for engagement with the rack teeth 28. The location or position of the pawl carrier 66 is determined by a lever 70 which is likewise mounted on the arm 30 intermediate the ends thereof and has a pin 72 engaged in a longitudinal slot 74 in the link 34 so that there is a lost motion connection between the link 34 and the lever 70. An upstanding arm 76 is mounted on the link 34 and at an upper end carries a brush holder 78 in which is resiliently mounted a contact brush 80 on which is a lug 82 for engagement with a reverse stop 84 mounted on an arm 86 on the track 10. A cooperating contact 88 is mounted in a recess 89 on the slide 12 so that when the brush 80 enters the recess 89 meets the contact 88 there will be established a ringing connection for a bell not shown.

A kick out finger 90 is pivotally connected to the lever 70 intermediate the ends thereof and terminates in a downturned portion 92 for removing the pawl 56 from the rack teeth 26. A pin 94 is pivotally connected to the finger 90 and extends through a pivoted holder 96 with a spring 98 compressed between the pivot point 100 and the member 96. The finger 90 is provided with a stop member 102 for engagement with a cam member 104 on the slide block 12 so that when the slide block is in its predetermined condition under the influence of the spring 22 the cam 104 will engage the stop 102 and push the link 34 to its maximum retarded position so that the push out terminal 92 will be withdrawn and the pawl 68 will be pressed into engagement with the teeth 28.

In the operation of the device according to the invention the recess 89 containing the contact 88 will be arranged at a predetermined distance along the block 12 so that a prdetermined number of impulses will be necessary to elevate the contact 88 into engaging relation with the brush 80. For example, the present block is engaged to operate under the indication of two shorts and a long. The actuation being as follows: A short impulse is received on the solenoid 52 which lifts the plunger 54 which carries the pawl 56 in engagement with the teeth 26 and lifts the block 12 one notch. The pawl 68 will then engage in a second tooth and will hold the block in elevated position. As soon as the plunger 54 has been elevated the pin 62 will be free to slide upwardly in the slot 60 and the spring 46 will tend to move the link 34 into operating position. However, the piston 36 in the dash pot 32 retards the action so that the lost motion connection of the slot 74 and the pin 72 prevents actuation of the lever 70. The short impulse then drops the plunger 54 which engages the bottom of the slot 60 and moves the bell crank 40 to its initial or retarded position restoring the plunger 36 to its fully extending position. The second short impulse will likewise move the block 12 up one notch where it will be held by the pawl 68. The return of the plunger 54 resetting everything as before. The third impulse will then be a longer ringing impulse so that when the plunger 54 is raised up it will be retained in raised position so that the spring 46 will operate a sufficient length of time so that the link 34 will carry the brush 80 into contact with the contact 88 and likewise will compress the spring 110 under the brush 80 so that the lost motion connection including the pin 72 and the slot 74 will actuate the lever 70 which will press the snap action device, consisting of pin 94, pivoted holder 96 and spring 98, forward so that the spring 98 will suddenly snap the lever 70 into forward position to withdraw the carrier 66 and remove the pawl 68 from contact with the rack 28 and at the same time the pawl contacting member 92 will remove the pawl 56 from the rack 26 so that the block 12 will be retained only by the brush 80 extending into the recess 89. As long as the impulse retains the plunger 54 in elevated position the brush 80 will make contact with the contact 88 and the ring of the telephone will continue. Upon the interruption of the impulse to the solenoid 52 the plunger 54 will drop resetting the bell crank 40 releasing the brush 80 prior to the contact of the slot 74 with the pin 72 so that the block will be returned to its initial position after which the snap acting spring 98 will return the reset finger 90 to inoperative position and move the pawl carrier 66 so that the pawl 68 is in operative position. It will thus be seen that the device completely resets after each operation so that it will be immediately ready to reoperate. All of the selectors will, of course, operate exactly alike and all will attempt to close a ringing circuit, however, only one selector will have contacts in proper position to close. The brushes 80 of the remaining selectors will engage the side of the block 12 and compress the springs 110 to prevent injury to the brushes or other portions of the selectors. It will also be apparent that all those selector switches other than the one which actually engages will immediately reset so that only that phone will be rung which has been selected.

For purpose of exemplification a particular embodiment of the invention has been shown, and described according to the best present understanding thereof. It will be apparent that changes and modifications can be made therein without departing from the true spirit of the invention.

Having described the invention, what is claimed as new is:

1. A bell ringing selector switch comprising a base member, a block slidably mounted on said base, a plurality of series of rack teeth on said block, a spring yieldingly urging said block to a predetermined position, a pawl carrier slidably mounted on said base, a spring pressed pawl carried by said pawl carrier, a lever pivoted on said base and operatively connected to said carrier, a solenoid fixed on said base, a plunger in said solenoid, a spring pressed pawl carried by said plunger, said plunger carried pawl normally extending into contact with a series of rack teeth, a bell crank pivoted on said base, biasing means yieldingly urging said bell crank in one direction, a link connected to said bell crank, a dash pot connected to said link, said dash pot retarding the motion of said bell crank in response to said biasing means, an operative connection between said bell crank and said plunger, a lost motion device in said connection, a lost motion connection between said link and said lever, a cam on said block, a stop on said link engaging said cam when said block is in said predetermined position, said block having a brush receiving recess, a contact mounted in said recess, a spring pressed brush carried by said link, said plunger being operable by short impulses to said solenoid to move said block on said track, said link being operable on the application of a long impulse to said solenoid to insert said brush in said recess, a kick out finger pivotally mounted on said lever, a snap action connection associated with said kick out finger, said snap action being operable on predetermined movement of said link to actuate said kick out finger to release said pawls whereby said block is supported by the engagement of said brush in said recess.

2. A bell ringing selector switch comprising a base member, a track on said base, a block slidably mounted on said track, a spring yieldingly urging said block to a predetermined position on said track, a plurality of series of rack teeth on said block, a laterally extending arm fixed on said base intermediate the ends of said track, a slide bearing fixed on said arm in spaced relation from said block, a pawl carrier slidably mounted in said bearing, a lever pivotally mounted on said arm and operatively connected to said pawl carrier, a spring pressed holding pawl carried by said pawl carrier, said holding pawl being movable into and out of engagement with one of said series of rack teeth, a solenoid mounted on said base in laterally spaced relation with said block, a plunger in said solenoid, a spring pressed lifting pawl carried by said plunger, said lifting pawl normally extending into contact with another of said series of rack teeth, a bellcrank pivoted on said base, biasing means yieldingly urging said bellcrank in one direction, an operative connection between said bellcrank and said plunger whereby the weight of the plunger is operative to move said bellcrank to another position in opposition to said biasing means, a link connected to said bellcrank, a dashpot mounted on said arm, a piston fixed on said link and slidable in said dashpot, said dashpot being operative to retard the motion of said bellcrank in response to said biasing means, a lost motion connection in said connection between said plunger and said bellcrank whereby said plunger may move in one direction independent of said bellcrank, a cam fixed on said block, a stop pin fixed on said link, said stop pin engaging said cam when said block is in the predetermined position under the influence of said spring, said block having a recess therein, a contact mounted in said recess, a brush holder mounted on said link, a brush resiliently mounted in said brush holder, said plunger being operative on application of short impulses thereto to actuate said plunger and said lifting pawl to traverse said block on said track, said plunger being held by a long impulse to said solenoid, whereby said biasing means operates said bellcrank to move said link to insert said brush into said recess to engage said contact, a kick out finger pivotally mounted on said lever, said kick out finger being operative on movement of said link to contact engaging position to release said pawls whereby said block is held by the engagement of said brush in said recess.

References Cited in the file of this patent

UNITED STATES PATENTS

| Number | Name | Date |
|---|---|---|
| 430,607 | Alexander | June 24, 1890 |
| 917,916 | Watson | Apr. 13, 1909 |
| 953,340 | Kneisly | Mar. 29, 1910 |
| 2,359,494 | Stickel | Oct. 3, 1944 |